United States Patent Office 3,331,510
Patented July 18, 1967

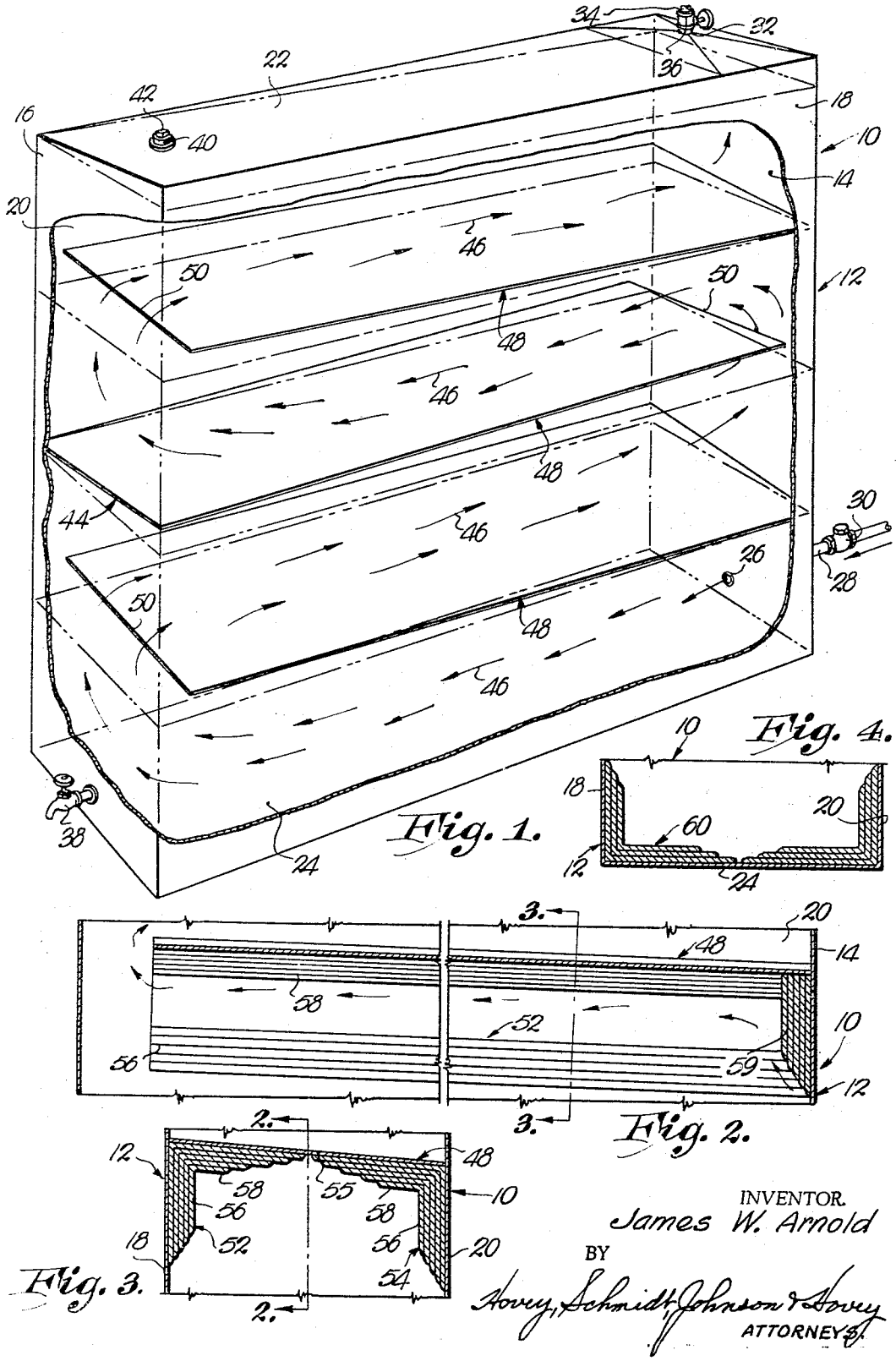

3,331,510
EMERGENCY WATER RESERVOIR
James W. Arnold, 5805 W. 100th Terrace,
Overland Park, Kans. 66207
Filed Sept. 8, 1964, Ser. No. 394,919
3 Claims. (Cl. 210—187)

This invention relates to water storage facilities and, more particularly, to a water supply which can be readily adapted for use with a water system where pure water is required or desired.

It is the primary object of the present invention to provide a reservoir structure which can be readily and easily coupled to the water system of a residence, building or the like, so as to provide a reserve supply of water for use in emergencies or during other periods when the main water supply is not to be used.

Another object of the present invention is the provision of reservoir structure of the aforesaid character which is constructed in a manner to prevent the formation of quiescent zones of water therewithin so as to eliminate stagnation of the water and the growth of bacteria at locations where such zones would otherwise occur.

Still another object of this invention is the provision of an emergency water reservoir of the type described which includes baffle structure disposed to eliminate the formation of air pockets in the reservoir and the accumulation of foreign deposits within and on the top surface of the water so as to eliminate the stagnation of the water due to these factors.

Yet a further object of the instant invention is the provision of an emergency water reservoir which is constructed in a manner so as to convey heat toward the center of the mass of water contained thereby, whereby convection currents are created in the water to prevent the formation of a quiescent zone at the center of the water mass, therefore precluding stagnation of the water by virtue of its being at rest. As a result, the water in the reservoir will remain substantially fresh for relatively long periods of time until the water is drawn from the reservoir at said outlet.

In the drawing:

FIGURE 1 is a perspective view of the emergency water reservoir forming the subject matter of the instant invention, parts being broken away and shown diagrammatically to illustrate details of construction;

FIG. 2 is a cross-sectional view taken along line 2—2 of FIG. 3 and illustrates baffle structure at the top of a chamber section within the reservoir to convey heat to the water therewithin as well as to prevent the formation of air pockets in the reservoir;

FIG. 3 is a cross-sectional view taken along line 3—3 of FIG. 2; and

FIG. 4 is a cross-sectional view similar to FIG. 3 but illustrating the baffle structure at the bottom of a chamber section opposite to the baffle structure shown in FIGS. 2 and 3.

The present invention relates to an emergency water supply for use in existing water systems and includes an enclosed tank of heat-conductive material having a pair of vertically spaced openings therein providing an inlet and an outlet therefor, the inlet opening being below the outlet opening. A tap is provided on the tank for removing water therefrom during emergency periods, the tap being located adjacent to the bottom of the tank so that substantially the entire supply of water therewithin may be removed. A vent having a removable closure thereon is provided on the tank to admit air thereto as water is being drawn therefrom by means of the tap.

Baffle structure between the inlet and outlet openings provides a serpentine path for the flow of water from the inlet to the outlet while at the same time preventing the formation of air pockets within the tank to thereby minimize the stagnation of water due to this factor. The baffle structure includes a number of vertically spaced baffles, each of which includes a number of interconnected, transversely L-shaped baffles of heat-conductive material, at least one of which is in heat exchange relationship to the inner surface of the tank. Since the tank is in heat exchange relationship to the air surrounding the same, heat is conveyed from the air through the tank and into the water via the baffle structure. Inasmuch as the water in most water systems is colder than the outside air, the heat conveyed into the tank by the baffle structure creates convection currents in the water which gently agitates the same to thereby prevent the formation of quiescent zones at the center of the mass of water. Consequently, stagnation of the water is prevented at locations where these zones would otherwise exist.

The emergency reservoir of the instant invention is broadly denoted by the numeral 10 and includes an enclosed tank 12 formed of heat-conductive material, such as copper or the like, and is normally disposed in heat exchange relationship with the air surrounding the same. For purposes of illustration only, tank 12 is polygonal in configuration and includes a pair of end walls 14 and 16, a pair of side walls 18 and 20, a top wall 22, and a bottom wall 24.

End wall 14 is provided with an opening 26 adjacent to bottom wall 24, and a pipe 28 in fluid communication with opening 26 extends outwardly therefrom for connection with a source of water under pressure, such as a municipal water main. A check valve 30 is coupled with pipe 28 to prevent reverse movement of water out of tank 12.

Top wall 22 is provided with an opening 32 from which a pipe 34 extends to permit the removal of water from tank 12. Openings 26 and 32 thus provide an inlet and an outlet respectively for tank 12. A valve 36 is coupled with pipe 34 to permit the removal of air from tank 12 as the latter is being filled from pipe 28.

A tap 38 is connected to end wall 16 adjacent to bottom wall 24 to permit the removal of water from tank 12 during an emergency or other periods when water from the main coupled with pipe 28 is not to be used. In this respect, a valve (not shown) will generally be provided in coupled relationship to pipe 28 to prevent water from entering tank 12 when tap 38 is opened.

Top wall 22 is provided with an opening 40 which is normally covered by a removable cap 42. When it is desired to remove water from tank 12 by means of tap 38, cap 42 is removed to admit air into tank 12 and thereby prevent the formation of an area of reduced air pressure above the level of the water in tank 12. A filter (not shown) could be provided in conjunction with opening 40 to filter the air entering tank 12. Moreover, if it is desired to remove water from tank 12 by tap 38 during periods when the atmosphere is contaminated, a source of gas, such as an oxygen tank or the like, could be coupled with valve 36 for admitting a quantity of the gas each time water is removed from tank 12 by means of tap 38.

Baffle structure 44 is provided within tank 12 to cause water to flow along a serpentine path denoted by arrows 46 in FIG. 1 as water moves from opening 26 to opening 32 during normal usage of the water system with which reservoir 10 is associated. Structure 44 includes a number of vertically spaced baffles 48, each having an extremity 50 spaced from the proximal end wall to provide a passage for water between the chamber sections defined between adjacent pairs of baffles 48 and between the chamber section defined by bottom wall 24 and the lowermost baffle 48. Thus, water entering tank 12 through opening 26 would flow longitudinally of bottom wall 24 toward end wall 16, thence upwardly into the chamber section between the lowermost pair of baffles 48, thence in the opposite direction toward end wall 14. This movement of the water would continue until it reached opening 32, assuming, of course, that water from tank 12 would be free to flow out of pipe 34. Generally, water entering through opening 26 from a main would be colder than the water already in tank 12; accordingly, the colder water would remain adjacent to bottom wall 24 while the warmer water would be in the chamber sections thereabove. Hence, a specific mass of water would progressively move toward top wall 22 and opening 32 and out of the latter through pipe 34 as like amounts of water are successively drawn out of tank 12 through pipe 34. It is assumed, of course, that pipe 34 is coupled with appliances or apparatus at different points of use in the structure with which reservoir 10 is associated.

It has been determined that when water enters a large tank and is drawn out of the latter, a central, quiescent zone is defined wherein the water in the zone is at rest or motionless. The water on both sides of this zone would, of course, move in the direction of flow of the water and would have little or no effect on the water at rest in the zone. Water in such zones may well give rise to stagnation because, over relatively long periods of time, bacteria are capable of growth in the water at these zones. As a result, a problem of sanitation arises which must be countered in order to maintain the water in tank 12 fit for human consumption. To counter this problem, each baffle is constructed so as to present a heat conveyor for transmitting heat from at least one of the end walls 14 or 16 and from side walls 18 or 20 to the water at the center of the proximal chamber section.

In this respect, each baffle 48 includes a first series of interconnected, transversely L-shaped baffle sections 52 coupled with side wall 18 and a second series of baffle sections 54 substantially identical in configuration with baffle sections 52 and associated with side wall 20. A panel 55 is disposed above baffle sections 52 and 54 and is coupled therewith, panel 55 spanning the distance between side walls 18 and 20 and extending transversely of the proximal end wall.

As shown in FIG. 2, the baffle sections 52 and 54 extend longitudinally of side walls 18 and 20. As shown in FIG. 3, each of the baffle sections 52 and 54 includes a vertically disposed segment 56 and a segment 58 interconnected with the upper extremity of the corresponding segment 56 and extending transversely therefrom in a direction away from the proximal side wall. Segments 56 and 58 of the innermost baffle section are less in transverse width than that of the outermost baffle section for a corresponding side wall. Segments 56 and 58 of the intermediate baffle sections progressively increase in transverse width as the outermost baffle section is approached.

Baffle sections 52 and 54 are formed from a heat-conductive material such as copper or the like, and thereby provide conductors of heat to the central portion of the proximal chamber section defined thereby in conjunction with side walls 18 and 20. Segments 56 of the outermost baffle sections 52 and 54 are in engagement with the inner surfaces of side walls 18 and 20 respectively, and thereby in heat exchange relationship therewith. Heat is conducted from the outermost baffle sections to the innermost baffle sections, and inasmuch as the transverse widths of segments 56 and 58 of the sections vary, heat is conducted to various points in the water contained in the chamber section below the corresponding baffle 48.

The heat conveyed inwardly from side walls 18 and 20 by each baffle 48 also heats the water above the baffle so as to create convection currents therewithin to thereby eliminate the quiescent zones in the chamber section above the baffle as mentioned above. The convection currents created in the water cause a gentle agitation thereof so that for all practical purposes, these quiescent zones do not have an opportunity to form to any great extent. Even if the zones were able to be formed, these convection currents would operate to minimize or completely eliminate the zones after reservoir 10 has been placed in operation.

Each of the baffle sections 52 and 54 has a segment 59 corresponding to the proximal end wall. As shown in FIG. 2, segments 59 are in juxtaposition with each other and the outermost segment 59 is in engagement with the inner surface of the proximal end wall. Hence, segments 59 are in heat exchange relationship with the end wall. Segments 59 extend laterally from segments 54 and downwardly from segments 58.

A baffle 60, similar in construction to baffles 48, is provided on bottom wall 24 in heat exchange relationship with the latter and side walls 18 and 20 in order to create convection currents in the lowermost chamber section of tank 12. Here again, a quiescent zone of the type mentioned above would be prevented from being formed in the lowermost chamber section because of the presence of baffle 60.

Baffles 48 are tilted with respect to bottom wall 24 so that air pockets are prevented from being formed between baffles 48 and adjacent walls. In this respect, one end of each extremity 50 is higher than the other end thereof as illustrated in FIG. 1, and the extremity opposite to extremity 50 is, for the most part, below the latter; accordingly, air below a particular baffle 48 will travel along the undersurface of the latter until extremity 50 is approached. Thereupon, the air will pass upwardly into the adjacent chamber section and will progressively move toward opening 32 in the same manner.

In operation, tank 12 is coupled to pipes 28 and 34 and water is admitted thereinto by the opening of a valve (not shown) which controls the flow of water from a main. Pipes 28 and 34 could well provide the inlet water conduit from the main to a residence, building, factory, or the like, which conduit is separated in any suitable manner to permit the installation of reservoir 10 in series relationship therewith. Thus, water will flow through reservoir 10 before it is delivered to the various points of use in the residence or building.

As tank 12 is being filled, air is allowed to bleed out of the system through valve 36 in the event that it is unable to do so through one of the appliances or other apparatus coupled with pipe 34. So long as tank 12 is completely full, the water system of the residence or building may be used continuously without interference from reservoir 10. For the most part, water will be continuously forced through tank 12 and stagnation, due to the aforesaid quiescent zones and due to the presence of air pockets, will not occur; accordingly, the water delivered to the various points of use through pipe 34 will remain fresh, notwithstanding the presence of reservoir 10.

In the event that an emergency arises, the water supply valve coupled with pipe 28 can be closed and water drawn out of tank 12 by means of tap 38. When this is required, air or other gas must be admitted into tank 12 to assure continuous removal of the water therefrom.

Tank 12 may be of various configurations without departing from the scope of the invention. Moreover, baffles 48 and 60 will be of configurations commensurate with the configuration of tank 12.

Tank 12 is normally positioned with bottom wall 24 horizontally disposed. In this position, air entering tank 12 through opening 26 will eventually move to opening 32 by virtue of the attitude of baffles 48. Due to the heaving of the earth, the structure associated with reservoir 10 would settle to a certain angle and, if this angle is within a specified range, baffles 48 would continue to be angularly disposed in a manner so as to direct air toward opening 32. Hence, reservoir 10 continues to be usable even though the ground or earth adjacent thereto causes settling of the structure with which reservoir 10 is associated.

Reservoir 10 provides a source of pure water for an extended period of time which can be utilized in emergencies such as during a flood, an earthquake, or a nuclear attack, during which periods the water from the mains with which pipe 28 is connected, would be contaminated and not fit for human consumption. In addition, reservoir 10 may be readily connected into the water system of a residence, building or the like without substantial modification thereto.

Having thus described the invention, what is claimed as new and desired to be secured by Letters Patent is:

1. In an emergency water reservoir:
an enclosed tank having a pair of vertically spaced openings therein providing an inlet and an outlet therefor, the inlet being disposed below said outlet; baffle structure within said tank between said openings and disposed to present a serpentine path for the flow of water from said inlet to said outlet with the major portion of the path being substantially horizontally disposed, said baffle structure being tilted with respect to the horizontal to permit air in a mass of water within the tank to rise toward said outlet, said tank and said baffle structure being formed from a heat-conductive material, said baffle structure having means in heat exchange relationship to said tank, the latter having an outer surface normally in heat exchange relationship to the air surrounding the tank, said means including a plurality of pairs of interconnected, elongated segments, each pair of segments being in juxtaposition to an adjacent pair of segments, one of the segments of each pair being in heat exchange relationship to the inner surface of the tank and the other segment being in heat exchange relationship to a mass of water contained in the tank.

2. In an emergency water reservoir as set forth in claim 1, wherein the transverse widths of the segments of the innermost pair are less than the transverse widths of the corresponding segments of the outermost pair, the transverse widths of the intermediate pairs being progressively smaller as the innermost pair is approached.

3. An emergency water reservoir for use with a water system comprising:
an enclosed tank having a pair of vertically spaced openings therein providing an inlet and an outlet therefor, the inlet being disposed below said outlet; baffle structure within said tank between said openings and disposed to present a serpentine path for the flow of water from said inlet to said outlet with the major portion of said path being substantially horizontally disposed;
said tank and said baffle structure being formed from a heat-conductive material, said baffle structure including a baffle having an upper and lower face and means extending outwardly from one of said faces and in engagement with the inner surface of the tank, said means including a plurality of stacked, interconnected, transversely L-shaped sections, each defining first and second leg segments, the first and second segments of each section being in face-to-face engagement with the corresponding first and second segments of an adjacent section; and
a tap connected to said tank in spaced relationship to said openings to permit water within said tank to be removed therefrom.

References Cited

UNITED STATES PATENTS

| | | | |
|---|---|---|---|
| 349,990 | 9/1886 | Gaillet et al. | 210—521 |
| 1,161,197 | 11/1915 | Corwin | 210—187 X |
| 1,689,557 | 10/1928 | Nordell | 210—136 X |
| 1,702,612 | 2/1929 | Morse | 210—187 |
| 1,946,415 | 2/1934 | Schmid | 210—187 X |
| 2,312,604 | 3/1943 | Thompson | 210—136 X |

REUBEN FRIEDMAN, *Primary Examiner.*

J. DE CESARE, *Assistant Examiner.*